United States Patent
Kaga et al.

(10) Patent No.: US 10,719,593 B2
(45) Date of Patent: Jul. 21, 2020

(54) BIOMETRIC SIGNATURE SYSTEM AND BIOMETRIC CERTIFICATE REGISTRATION METHOD

(71) Applicant: Hitachi, Ltd., Tokyo (JP)

(72) Inventors: Yosuke Kaga, Tokyo (JP); Masakazu Fujio, Tokyo (JP); Kenta Takahashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 157 days.

(21) Appl. No.: 15/758,765

(22) PCT Filed: Jun. 23, 2016

(86) PCT No.: PCT/JP2016/068640
§ 371 (c)(1),
(2) Date: Mar. 9, 2018

(87) PCT Pub. No.: WO2017/221368
PCT Pub. Date: Dec. 28, 2017

(65) Prior Publication Data
US 2019/0042716 A1 Feb. 7, 2019

(51) Int. Cl.
*G06F 21/32* (2013.01)
*H04L 9/32* (2006.01)
(Continued)

(52) U.S. Cl.
CPC .............. *G06F 21/32* (2013.01); *G06F 21/33* (2013.01); *H04L 9/3231* (2013.01);
(Continued)

(58) Field of Classification Search
None
See application file for complete search history.

(56) References Cited

U.S. PATENT DOCUMENTS

| | | | |
|---|---|---|---|
| 2003/0046237 A1* | 3/2003 | Uberti | G06Q 20/04 705/44 |
| 2004/0059924 A1* | 3/2004 | Soto | G06F 21/32 713/186 |

(Continued)

FOREIGN PATENT DOCUMENTS

EP 1 777 640 A1 4/2007
JP 2007018436 A * 1/2007
(Continued)

OTHER PUBLICATIONS

International Search Report of PCT/JP2016/068640 dated Sep. 20, 2016.
(Continued)

*Primary Examiner* — Taghi T Arani
*Assistant Examiner* — Joshua Raymond White
(74) *Attorney, Agent, or Firm* — Mattingly & Malur, PC

(57) ABSTRACT

This biometric signature system comprises: a biometric certificate storage module that stores a biometric certificate generated on the basis of a user's biometric information; a biometric information acquisition module that acquires new biometric information from the user; a biometric certificate generation module that generates a new biometric certificate on the basis of the new biometric information; a biometric signature generation module that assigns a biometric signature to the new biometric certificate on the basis of the new biometric information; a biometric signature verification module that verifies the biometric signature using the biometric certificate stored in the biometric certificate storage module; and a biometric certificate registration module that registers the new biometric certificate in the biometric certificate storage module if verification of the biometric signature was successful.

9 Claims, 10 Drawing Sheets

(51) Int. Cl.
    *G06F 21/33*    (2013.01)
    *G07C 9/26*     (2020.01)
(52) U.S. Cl.
    CPC .............. *H04L 9/3268* (2013.01); *G07C 9/26* (2020.01); *G07C 2209/12* (2013.01)

(56)         References Cited

U.S. PATENT DOCUMENTS

2005/0229007 A1*  10/2005  Bolle ...................... G06F 21/32
                                                         713/186
2006/0277414 A1*  12/2006  Kotani .................... G06F 21/32
                                                         713/189
2007/0094509 A1    4/2007  Wei et al.
2015/0381616 A1*  12/2015  Jo ......................... H04L 63/0861
                                                         713/186
2017/0032485 A1*   2/2017  Vemury ............... G06Q 50/265

FOREIGN PATENT DOCUMENTS

JP        2013-123142 A       6/2013
JP         2013123142 A   *   6/2013
JP        2016-012806 A       1/2016

OTHER PUBLICATIONS

Extended European Search Report received in corresponding European Application No. 16906285.8 dated Jan. 27, 2020.

* cited by examiner

BIOMETRIC SIGNATURE SYSTEM AND BIOMETRIC CERTIFICATE REGISTRATION METHOD

BACKGROUND OF THE INVENTION

This invention relates to a biometric authentication system, and more particularly, to registration of a biometric certificate generated from biometric information.

A biometric authentication system performs personal authentication based on biometric information such as a fingerprint, a vein, an iris, a face, voice, and handwriting. Those pieces of biometric information are private information to be handled with care, and it is therefore required to manage the information properly to prevent leakage of the information. Further, the biometric authentication is expected to be widely used as social infrastructure from now on, but in order to use a large number of biometric authentication systems, it is required to register biometric information with each system. Thus, the user's time and effort to register the information is a factor that inhibits the widespread use of the biometric authentication systems.

JP 2013-123142 A is known as a technology for solving those problems. JP 2013-123142 A has the following description: "At the time of registration, a biometric signature system embeds a predetermined secret key into a feature quantity of biometric information on a user, and issues a biometric certificate containing a set of the feature quantity and a corresponding public key. At the time of signature, the biometric signature system newly generates a pair of a temporary secret key and a temporary public key for a signature feature quantity of biometric information on the user, creates a signature for a message through use of the temporary secret key, creates a commitment by embedding the temporary secret key into the signature feature quantity, and sets a set of the temporary public key, the signature, and the commitment as a biometric signature. At the time of verification of the biometric signature, the biometric signature system verifies the signature based on the temporary public key, and generates a difference secret key and a difference public key from the biometric certificate, the commitment, and the temporary public key to verify their correspondence."

SUMMARY OF THE INVENTION

According to JP 2013-123142 A described above, with the technology called "biometric signature", which uses biometric information as a key, a biometric certificate obtained by subjecting the biometric information to one-way conversion is generated. It has been proved that the biometric certificate cannot be restored mathematically to the original biometric information, and a risk of leakage of biometric information can thus be reduced with this technology. Moreover, when the biometric certificate is shared among a plurality of terminals and systems for use, the plurality of terminals and systems are allowed to use the biometric certificate generated once, and hence it is possible to promote widespread use of the biometric authentication.

Meanwhile, false rejection is known as a problem inherent in a general biometric authentication system including the above-mentioned biometric signature system. The false rejection refers to a phenomenon in which, although a genuine user correctly registers his or her biometric information and then tries to authenticate himself or herself, it is determined by the biometric authentication system that the user is not a genuine user, and hence the user fails to be authenticated. The false rejection is a phenomenon that occurs in various biometric authentication systems, and reregistration of biometric information is known as a simple and effective measure against the false rejection. When the biometric information is acquired again from a genuine user, and the acquired biometric information is registered, it is possible to reduce a rate of false rejection caused by, for example, low-quality registered biometric information or a change over time of biometric information. However, in order to reregister the biometric information, it is required to have a genuine user come to a registration authority and confirm whether or not the user is a genuine user, and then acquire biometric information on the user, which requires time and effort for the user and a person in charge of managing biometric information.

When the above-mentioned biometric information reregistration is performed in the biometric signature system, it is required to perform completely the same procedure as that described above. That is, it is required to have a genuine user come to the registration authority and confirm whether or not the user is a genuine user, and then acquire biometric information on the user. Such a procedure increases time and effort for the user and the person in charge of managing biometric information, and hence there has been a demand for reregistering biometric information more easily and at lower cost.

It is an object of this invention is to implement safe reregistration of biometric information without imposing a load on a user and a person in charge of managing biometric information.

A representative example of the present invention is as follows: a biometric signature system, comprising: a biometric certificate storage module configured to store a biometric certificate generated based on biometric information on a user; a biometric information acquisition module configured to acquire new biometric information on the user; a biometric certificate generation module configured to generate a new biometric certificate based on the new biometric information; a biometric signature generation module configured to assign a biometric signature to the new biometric certificate based on the new biometric information; a biometric signature verification module configured to verify the biometric signature through use of the biometric certificate stored in the biometric certificate storage module; and a biometric certificate registration module configured to register the new biometric certificate with the biometric certificate storage module when the biometric signature is successfully verified.

According to the one embodiment of this invention, it is possible to safely update the biometric certificate without imposing a load on the user and a person in charge of managing biometric information. Objects, configurations, and effects other than those described above become more apparent from the following descriptions of embodiments of this invention.

DETAILED DESCRIPTION OF THE PREFERRED EMBODIMENTS

First Embodiment

A first embodiment of this invention is a system for safely updating a biometric certificate via a network only by inputting biometric information by a user through the same procedure as that of normal authentication.

A description is now given of the first embodiment in detail with reference to the drawings.

Figure 1:
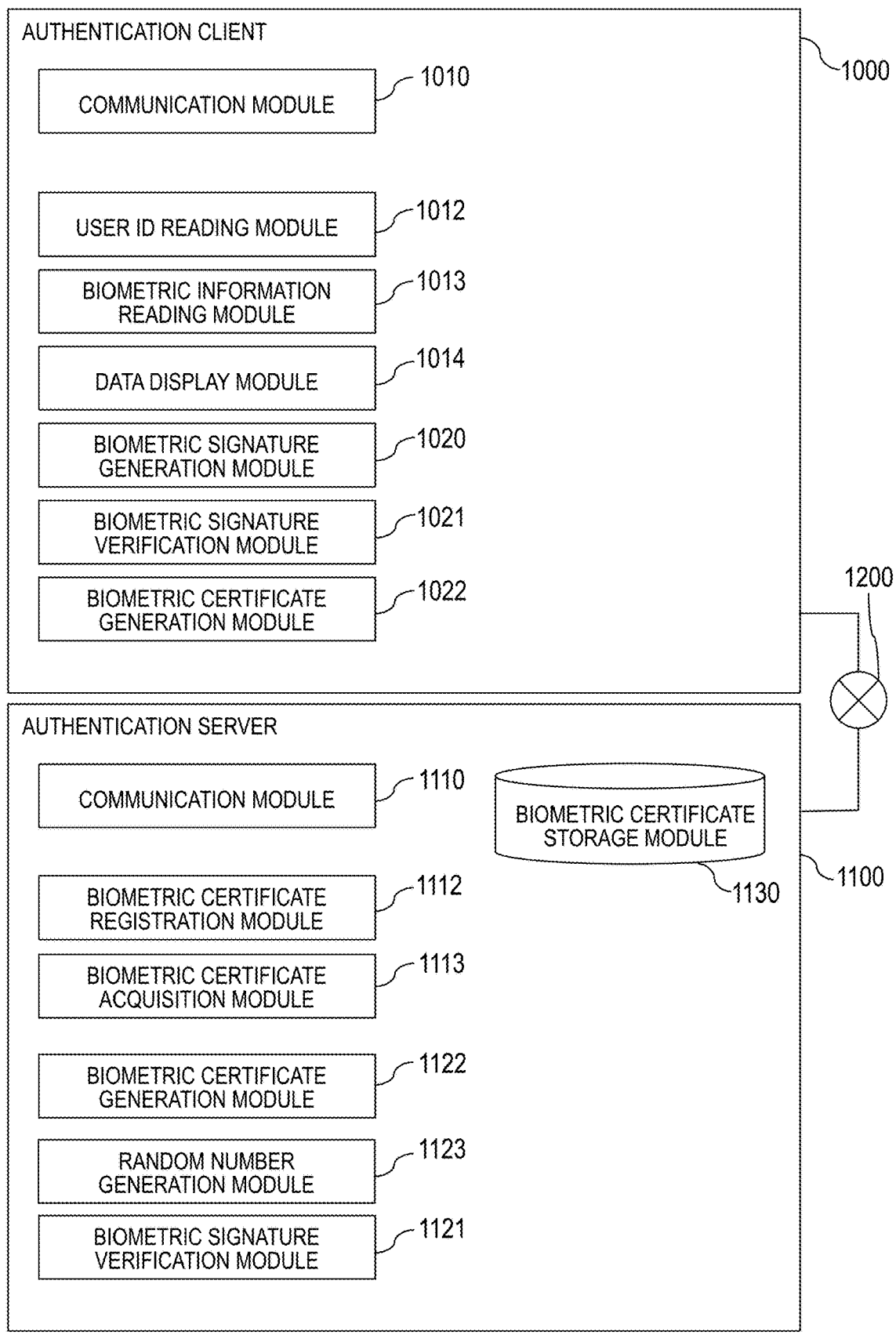
FIG. 1 is a block diagram for illustrating configurations of an authentication client and an authentication server in a first embodiment of this invention.

FIG. 1 is a block diagram for illustrating configurations of an authentication client and an authentication server in the first embodiment of this invention.

In FIG. 1, an authentication client 1000 includes a communication module 1010, a user ID reading module 1012, a biometric information reading module 1013, a data display module 1014, a biometric signature generation module 1020, a biometric signature verification module 1021, and a biometric certificate generation module 1022.

The communication module 1010 is configured to communicate to/from the authentication server 1100 via a network 1200.

The user ID reading module 1012 is configured to read an ID from a user via, for example, a keyboard.

The biometric information reading module 1013 is configured to read biometric information such as a fingerprint, a vein, or a face image from the user via, for example, a fingerprint sensor, a vein sensor, or a camera.

Figure 7:
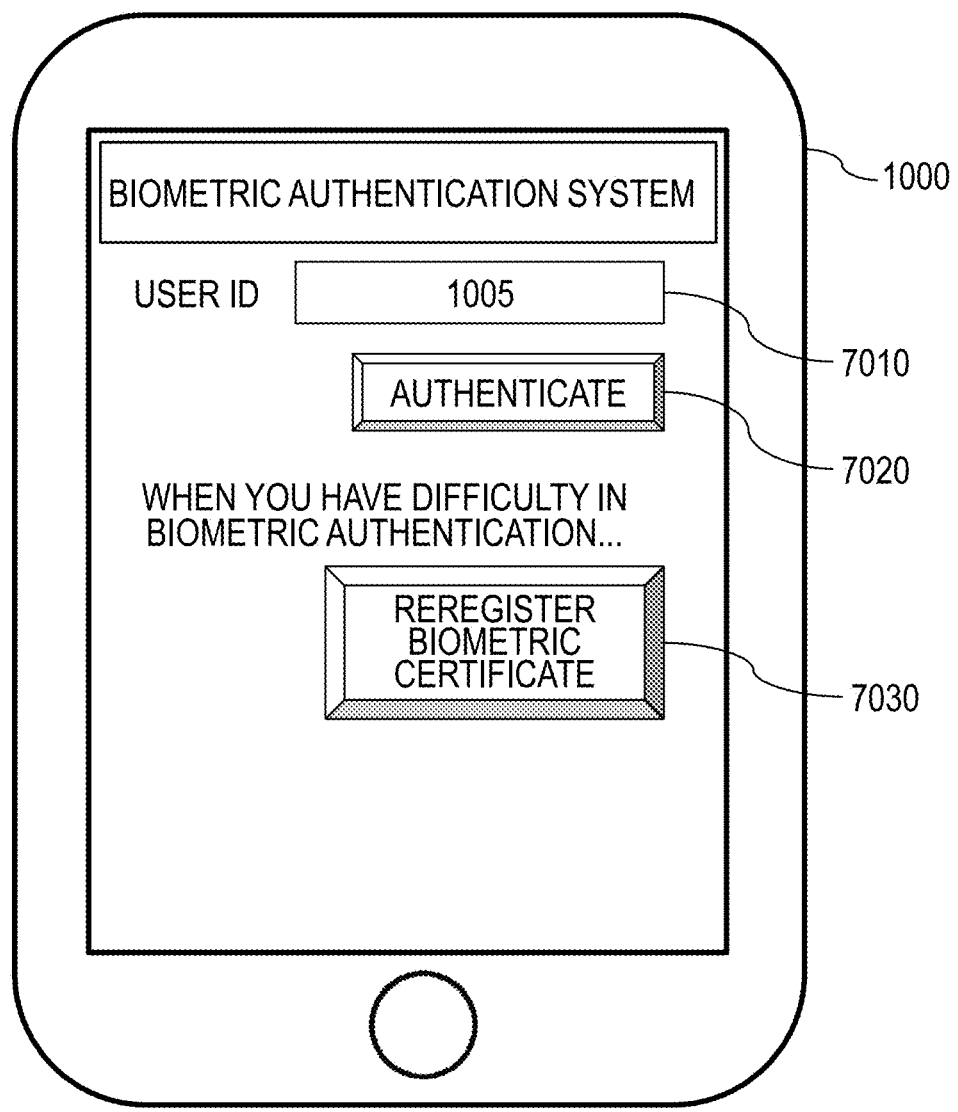
FIG. 7 is an explanatory diagram for illustrating an example of a UI of the authentication client in the first embodiment of this invention.
Figure 8:
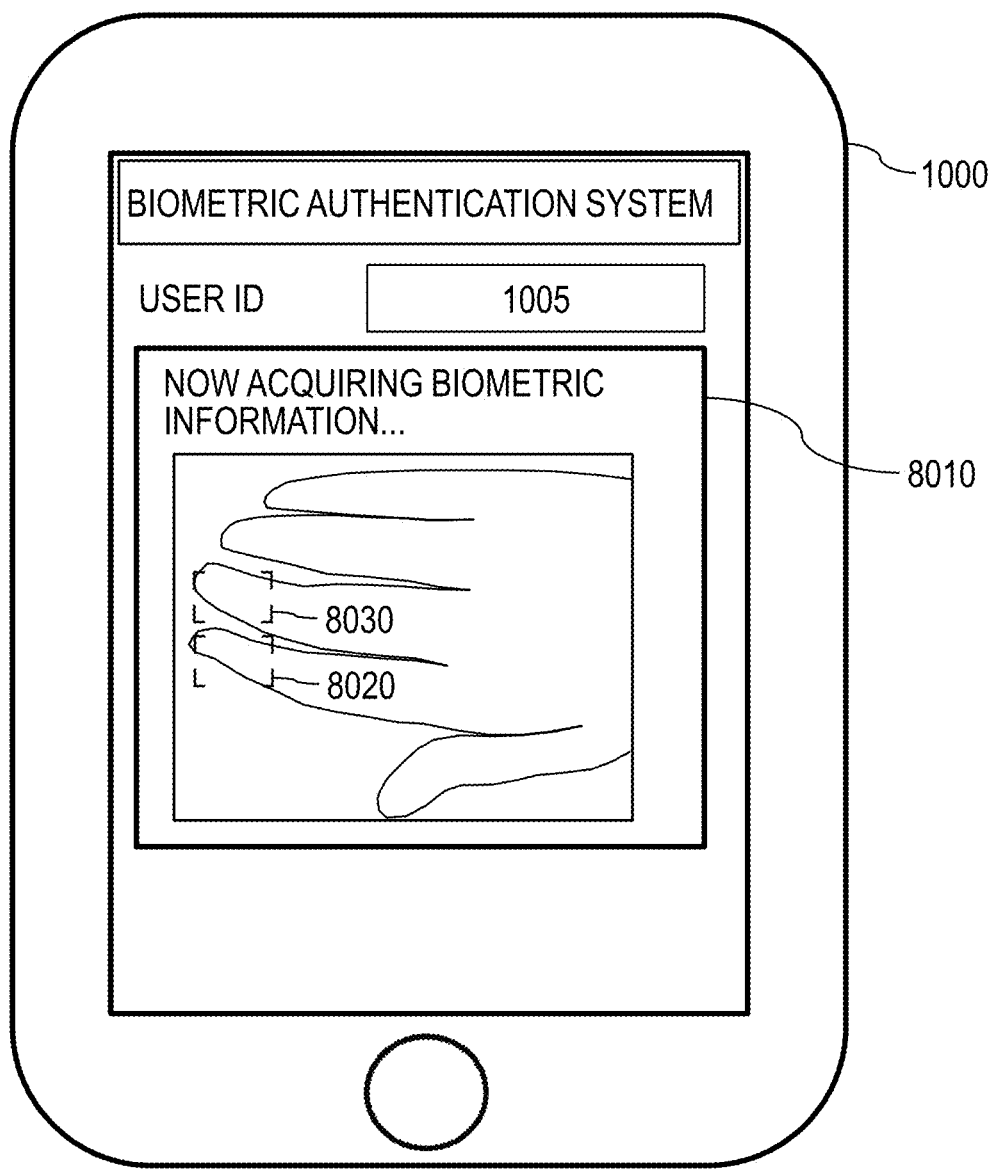
FIG. 8 is an explanatory diagram for illustrating an example of a UI for guaranteeing that first biometric information and second biometric information are acquired from the same person in the second embodiment of this invention.

The data display module 1014 is configured to display an authentication result and other information via, for example, a display, to present the information to the user. The data display module 1014 may also be configured to display user interface screens to be described later, which are illustrated in FIG. 7 and FIG. 8.

The biometric signature generation module 1020 is configured to generate a biometric signature to be assigned to, for example, a random number or a biometric certificate.

The biometric signature verification module 1021 is configured to verify validity of a biometric signature through use of the biometric signature and the biometric certificate.

The biometric certificate generation module 1022 is configured to generate a biometric certificate based on the biometric information. For example, the biometric certificate of each user may include identification information (user ID) on the user, and a pubic template obtained by subjecting the biometric information on the user to one-way conversion.

The authentication server 1100 includes a communication module 1110, a biometric certificate registration module 1112, a biometric certificate acquisition module 1113, a biometric certificate generation module 1122, a random number generation module 1123, a biometric signature verification module 1121, and a biometric certificate storage module 1130.

The communication module 1110 is configured to communicate to/from the authentication client 1000 via the network 1200.

The biometric certificate registration module 1112 is configured to register the biometric certificate generated by the biometric certificate generation module 1122 with the biometric certificate storage module 1130.

The biometric certificate acquisition module 1113 is configured to acquire, based on the user ID, the biometric certificate stored in the biometric certificate storage module 1130.

The random number generation module 1123 is configured to generate a random number.

The biometric certificate storage module 1130 is configured to store the biometric certificate generated by the biometric certificate generation module 1122.

Figure 2:
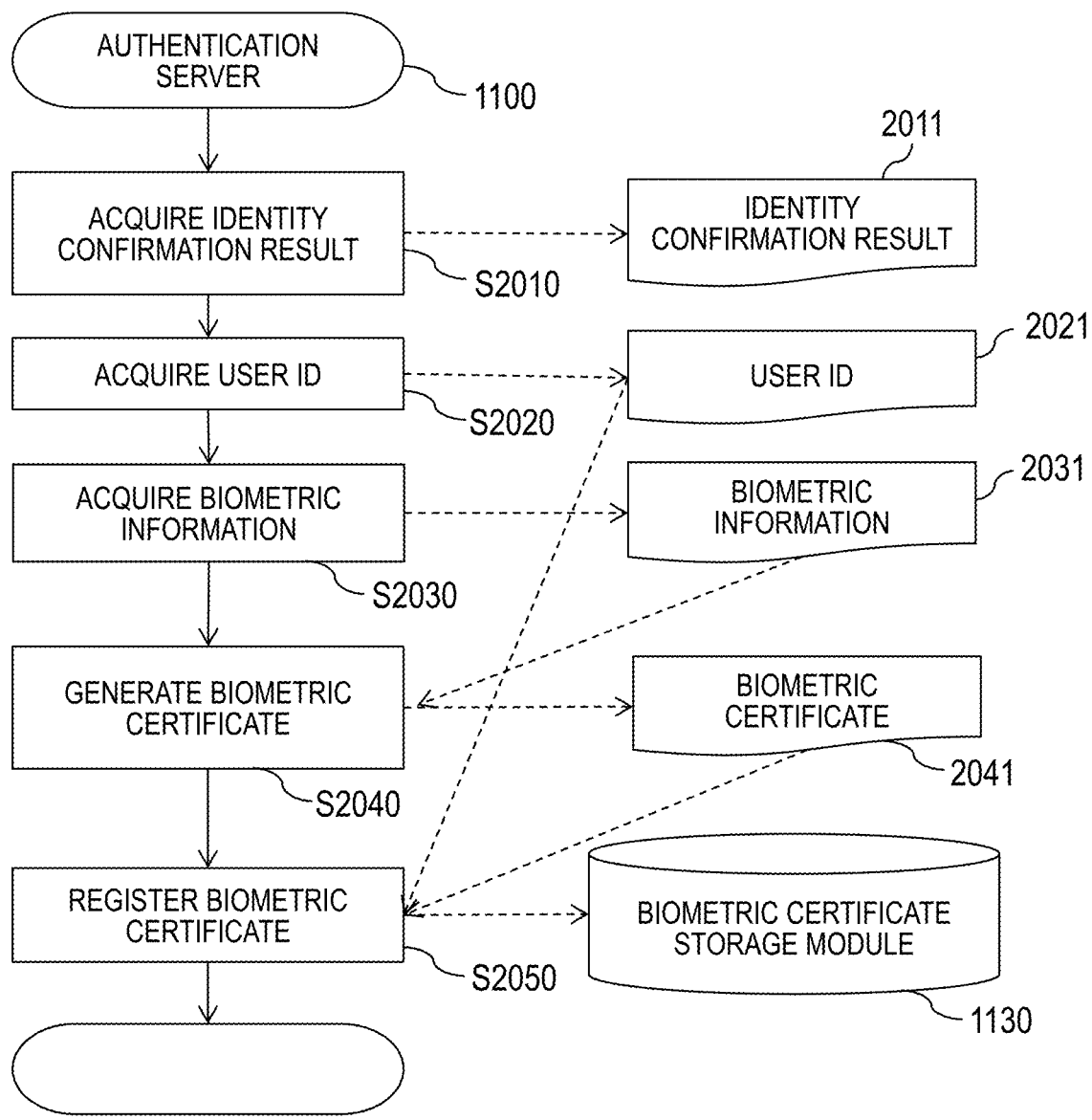
FIG. 2 is a flowchart for illustrating a processing procedure performed when a biometric certificate is registered in the first embodiment of this invention.
Figure 3:
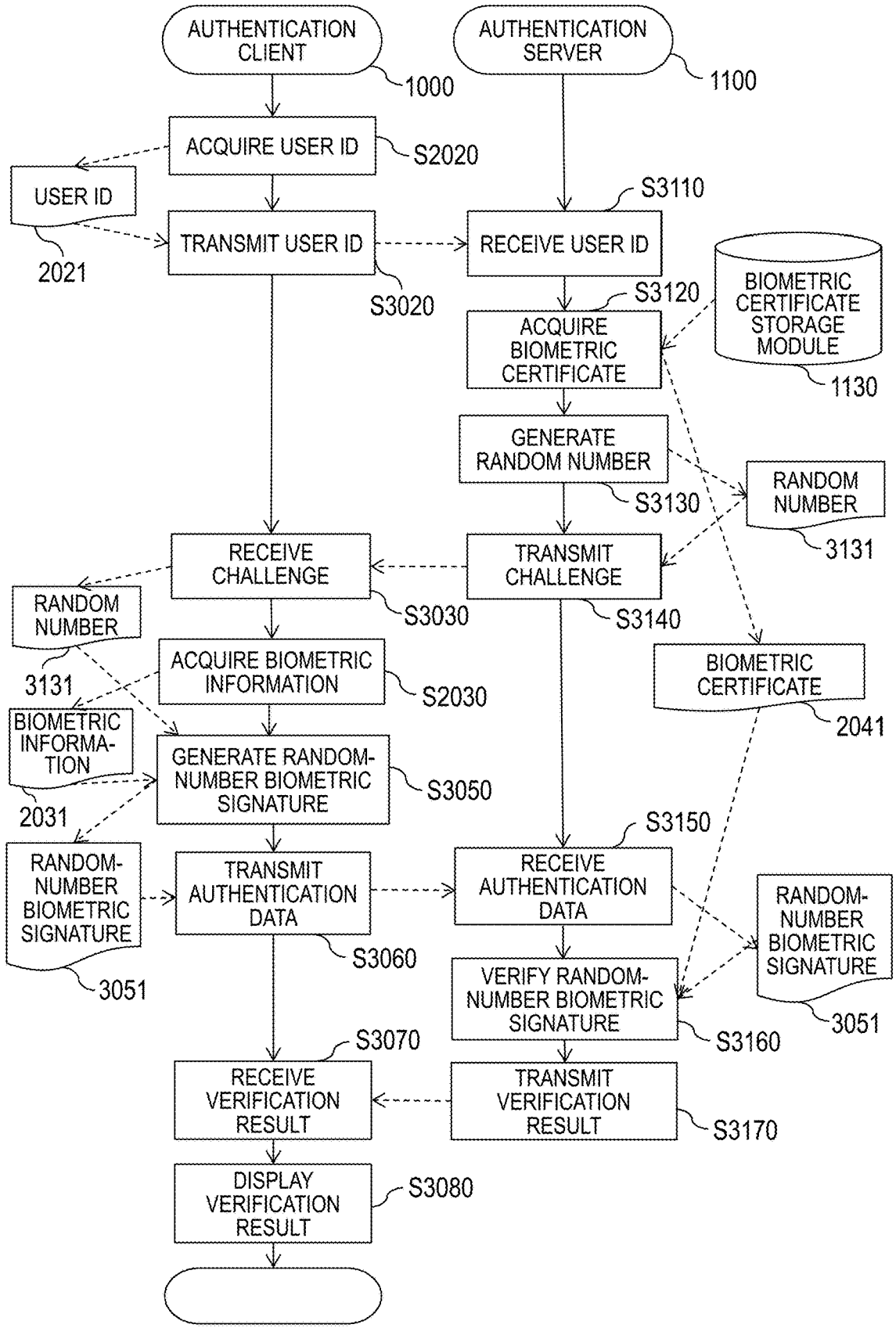
FIG. 3 is a flowchart for illustrating a processing procedure of performing user authentication through use of a biometric certificate in the first embodiment of this invention.

Referring to FIG. 2 to FIG. 4, a description is given of processing procedures in the first embodiment of this invention.

FIG. 2 is a flowchart for illustrating a processing procedure performed when a biometric certificate is registered in the first embodiment of this invention.

This processing is performed in order to allow the user to first register the biometric information with the system and then receive an authentication service, and is performed at, for example, a registration authority of the system via an operator.

First, the authentication server 1100 receives an identity confirmation result 2011 (Step S2010). The identity confirmation result 2011 is a result indicating that the identify confirmation has been performed correctly by a certain measure, and is issued when, for example, the operator of the registration authority visually checks the user's identification to confirm that the user is a genuine user.

Next, the user ID reading module 1012 acquires a user ID 2021 assigned to a user to be registered (Step S2020). When an ID is assigned in advance, and a biometric certificate 2041 is assigned in association with the assigned ID, the user ID 2021 is acquired by receiving input of the ID from the operator. Meanwhile, when an ID is not issued in advance, an ID that is uniquely associated with the user is issued in Step S2020.

Next, the biometric information reading module 1013 acquires biometric information 2031 from the user (Step S2030). The biometric information 2031 is a physical feature such as a fingerprint, a vein, or a face, and is acquired by, for example, a fingerprint sensor, a vein sensor, or a camera.

Although not shown in FIG. 1, the authentication server 1100, which executes the processing of FIG. 2, includes the user ID reading module 1012 and the biometric information reading module 1013 as with the authentication client 1000, and those modules execute Step S2020 and Step S2030 described above.

Next, the biometric certificate generation module 1122 generates the biometric certificate 2041 from the biometric information 2031 (Step S2040). This generation of the biometric certificate 2041 is performed based on the method disclosed in JP 2013-123142 A, that is, by embedding a secret key into the biometric information 2031.

Finally, the biometric certificate registration module 1112 registers the biometric certificate 2041 with the biometric certificate storage module 1130 in association with the user ID 2021 (Step S2050).

After the steps described above, the processing of generating the biometric certificate 2041 from the biometric information 2031 acquired from the user to register the biometric certificate 2041 is completed.

In this invention, through the use of the registered biometric certificate 2041, for example, user authentication can be performed over the network, or a biometric signature assigned to a document can be verified. In the following, a description is first given of a processing procedure performed when user authentication is performed through use of the biometric certificate 2041, and a description is then given of update of the biometric certificate, which is an object of this invention.

FIG. 3 is a flowchart for illustrating a processing procedure of performing user authentication through use of the biometric certificate 2041 in the first embodiment of this invention.

First, in the authentication client 1000, the user ID reading module 1012 acquires the user ID 2021 (Step S2020).

Next, the authentication client 1000 transmits the user ID 2021 to the authentication server 1100 via the communication module 1010 (Step S3020). In the first embodiment, the authentication client 1000 acquires the user ID 2021 and transmits the user ID 2021 to the authentication server 1100, but a mode in which acquisition and transmission of the user ID 2021 are not performed is also conceivable. In this case, the procedure involving Step S2020, Step S3020, and Step S3110 is not performed, and only an authentication request is transmitted from the authentication client 1000 to the authentication server 1100.

In the authentication server 1100, the user ID 2021 is received via the communication module 1110 (Step S3110), and the biometric certificate acquisition module 1113 acquires the biometric certificate 2041 corresponding to the acquired user ID 2021 from among biometric certificates of a plurality of users registered with the biometric certificate storage module 1130 (Step S3120). When the user ID 2021 is not transmitted from the authentication client 1000, the biometric certificate acquisition module 1113 does not acquire the biometric certificate 2041 corresponding to the user ID 2021, but acquires all the registered biometric certificates 2041.

Next, in the authentication server 1100, the random number generation module 1123 generates a random number 3131 to be used for challenge-response authentication (Step S3130), and the communication module 1110 transmits the obtained random number 3131 to the authentication client 1000 (Step S3140).

In FIG. 3, only the random number 3131 is transmitted to the authentication client 1000 as a challenge, but the biometric certificate 2041 may be included in the challenge. In this case, Step S3160 of verifying a random-number biometric signature can also be performed on the authentication client 1000 side, and hence the verification result can be grasped before the transmission of authentication data. With this, when the user fails in the biometric authentication because an error between the biometric information 2031 acquired at the time of registration and the biometric information 2031 acquired by the authentication client 1000 is large, the fact is detected in advance so that the result can be displayed quickly and guidance for a retrial can be given.

Next, in the authentication client 1000, the communication module 1010 receives the random number 3131 (Step S3030).

Next, in the authentication client 1000, the biometric information reading module 1013 acquires the biometric information 2031 from the user (Step S2030), and the biometric signature generation module 1020 uses the acquired biometric information 2031 to generate a random-number biometric signature 3051 that is based on the random number 3131 (Step S3050).

Next, in the authentication client 1000, the communication module 1010 transmits the obtained random-number biometric signature 3051 to the authentication server 1100 as the authentication data (Step S3060).

Next, in the authentication server 1100, the communication module 1110 receives the authentication data from the authentication client 1000 (Step S3150), and the biometric signature verification module 1121 verifies the obtained random-number biometric signature 3051 based on the biometric certificate 2041 (Step S3160). The random-number biometric signature 3051 is successfully verified when, as described in JP 2013-123142 A, an error between the biometric information 2031 acquired when the biometric certificate 2041 is registered in the processing of FIG. 2 and the biometric information 2031 acquired by the authentication client 1000 in the processing of FIG. 3 is less than a given value, and the biometric signature is generated based on the random number 3131 generated in Step S3130. Therefore, when an error between the biometric information 2031 acquired when the biometric certificate 2041 is registered in the processing of FIG. 2 and the biometric information 2031 acquired by the authentication client 1000 in the processing of FIG. 3 is large, that is, when the user cannot be confirmed as a genuine user, the verification fails. Also when data to which the signature is assigned cannot be confirmed as the random number 3131, the verification results in failure. Through this procedure, the authentication server 1100 securely confirms that a genuine user has transmitted the authentication data.

When the user ID 2021 is not transmitted from the authentication client 1000 in Step S3020, the authentication server 1100 uses all the registered biometric certificates 2041 to verify the random-number biometric signature so as to search for the biometric certificate 2041 that is successfully verified, and determines a user ID corresponding to the obtained biometric certificate 2041 as the verification result.

Next, the authentication server 1100 transmits the obtained verification result to the authentication client 1000 via the communication module 1110 (Step S3170). In the authentication client 1000, the communication module 1010 receives the verification result (Step S3070), and the data display module 1014 displays details of the verification result (Step S3080).

Through the processing described above, the user authentication that uses the biometric certificate 2041 is finished. The registration of the biometric certificate 2041 and the user authentication that uses the registered biometric certificate 2041, which are described above, are the processing procedure disclosed in JP 2013-123142 A, in which user authentication is performed through use of a biometric signature system. However, in JP 2013-123142 A, a procedure to be performed when the biometric certificate 2041 is updated is not described. An obvious method for update is to perform again the biometric certificate registration procedure illustrated in FIG. 2, but in this case, it is required to perform Step S2010 of acquiring the identity confirmation result again. The identity confirmation result 2011 is issued after the operator has confirmed that the user is a genuine user with use of his or her identification, and hence this procedure cannot be performed online. Thus, the user is required to go to the registration authority of the system again to register biometric information.

In this invention, in order to allow the biometric certificate 2041 to be safely updated online, the authentication client 1000 newly generates a new biometric certificate 4061 and assigns a biometric signature to the new biometric certificate 4061, and the authentication server 1100 verifies the new biometric signature with biometric signature.

Figure 4A:
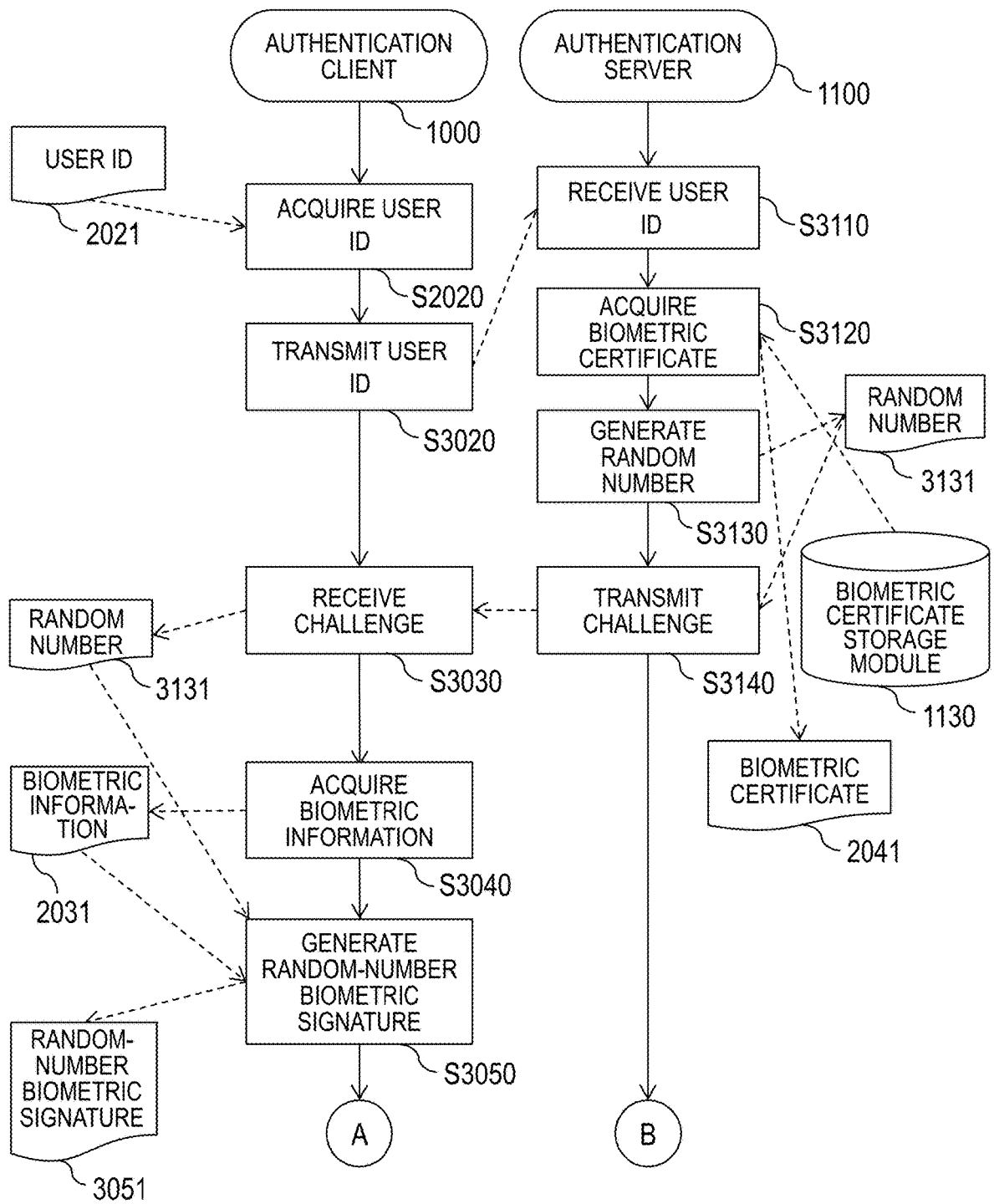
FIG. 4A and FIG. 4B are flowcharts for illustrating a processing procedure of reregistering the biometric certificate in the first embodiment of this invention.
Figure 4B:
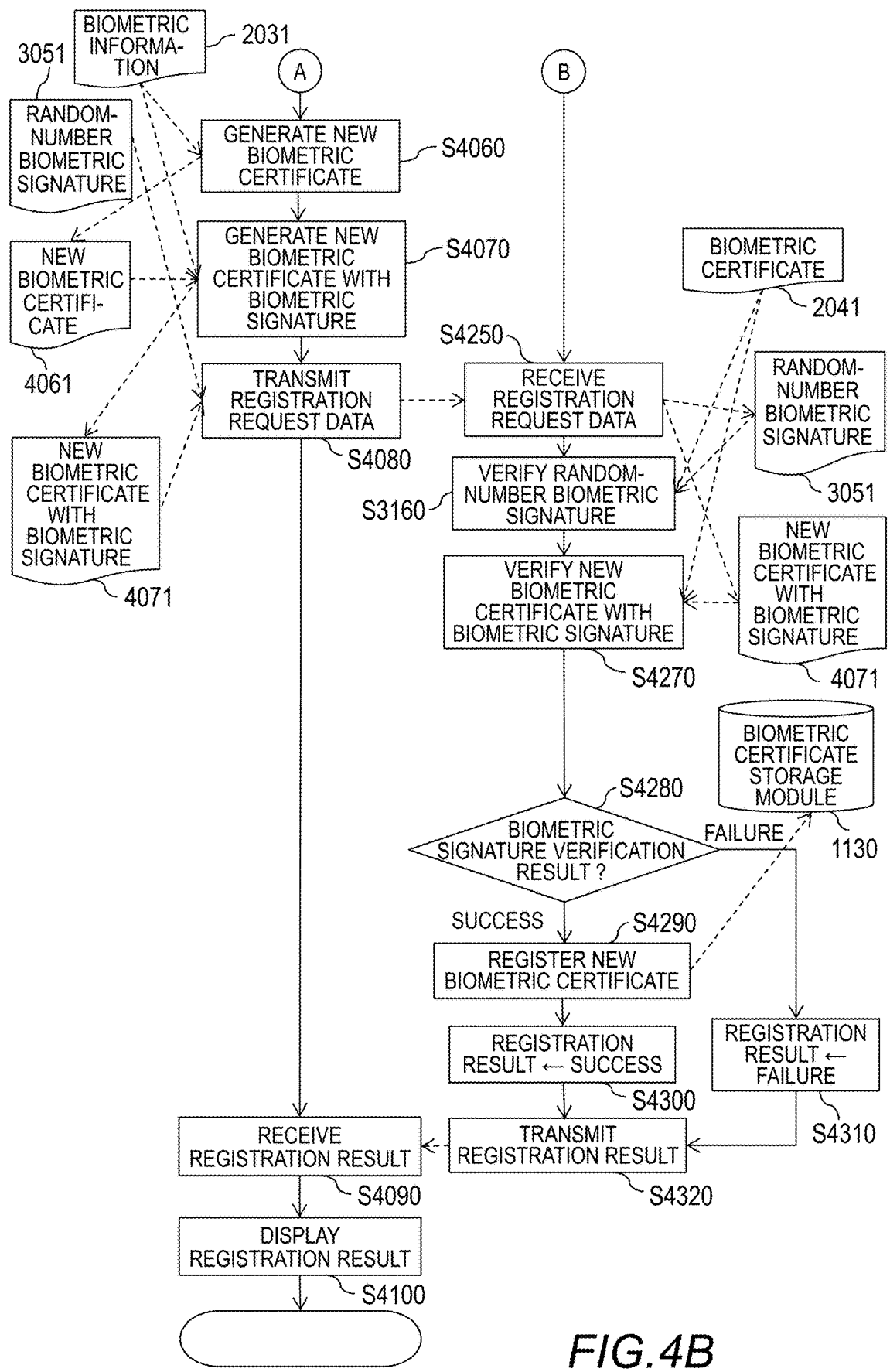

FIG. 4A and FIG. 4B are flowcharts for illustrating a processing procedure of reregistering the biometric certificate 2041 in the first embodiment of this invention.

The procedure illustrated in FIG. 4A and FIG. 4B is performed when the user requests reregistration of the biometric certificate 2041. Even when the user does not intentionally execute the reregistration, a frequency of occurrence of false rejection (that is, a user who has requested authentication fails in verification of the biometric signature although the user is a genuine user corresponding to the biometric certificate used for the authentication) may be estimated based on past authentication results so that, when false rejection occurs at a given frequency or more, reregistration of the biometric certificate 2041 may be automatically performed. With this, the reregistration can be performed not only when the user recognizes the necessity for reregistration, but also when the necessity for reregistration arises due to a change over time of biometric information that is not noticed by the user, for example.

The procedure illustrated in FIG. 4A and FIG. 4B is performed after the biometric certificate registration illustrated in FIG. 2 is completed, and Step S2020 of acquiring a user ID to Step S3050 of generating a random-number biometric signature are the same as those of the user authentication procedure of FIG. 3.

Next, the biometric certificate generation module 1022 receives the biometric certificate 2041 as input to generate the new biometric certificate 4061 (Step S4060). In this step, the biometric information 2031 acquired by the authentication client 1000 is received as input, but details of processing are the same as those of Step S2040 of generating a biometric certificate in the biometric certificate registration.

Next, the biometric signature generation module 1020 assigns a biometric signature to the new biometric certificate 4061 through use of the biometric information 2031 to generate a new biometric certificate with biometric signature 4071 (Step S4070). With this, it is possible to prevent data from being tampered during communication from the authentication client 1000 to the authentication server 1100 to result in reregistration of an unauthorized biometric certificate.

Next, the communication module 1010 transmits the obtained new biometric certificate with biometric signature 4071 and random-number biometric signature 3051 to the authentication server 1100 as registration request data (Step S4080).

Next, in the authentication server 1100, the communication module 1110 receives the registration request data (Step S4250), and the biometric signature verification module 1121 verifies the random-number biometric signature 3051 included in the registration request data through use of the biometric certificate 2041 (Step S3160).

Next, the biometric signature verification module 1121 verifies the new biometric certificate with biometric signature 4071 included in the registration request data through use of the biometric certificate 2041 (Step S4270). For example, when the method described in JP 2013-123142 A is adopted, the biometric signature verification module 1121 can determine that the biometric signature is successfully verified when an error between the biometric information used to generate the biometric certificate 2041 and the biometric information used to assign the biometric signature to the new biometric certificate 4061 is determined to satisfy a predetermined condition (e.g., smaller than a predetermined value). With this, it is possible to safely register the new biometric certificate via the network 1200.

Next, when at least one of the biometric signature verification results obtained in Step S3160 and Step S4270 indicates failure of verification (Step S4280: failure), the biometric signature verification module 1121 substitutes "failure" into a registration result (Step S4310), and the communication module 1110 transmits the obtained registration result of "failure" to the authentication client 1000 (Step S4320).

Meanwhile, when all of the biometric signature verification results obtained in Step S3160 and Step S4270 indicate success of verification (Step S4280: success), the biometric certificate registration module 1112 registers the new biometric certificate 4061 with the biometric certificate storage module 1130 (Step S4290), and substitutes "success" into the registration result (Step S4300). Then, the communication module 1110 transmits the obtained registration result of "success" to the authentication client 1000 (Step S4320).

With this, when the normal user authentication illustrated in FIG. 3 results in success, and it is guaranteed that the new biometric certificate 4061 is generated from the biometric information on a genuine user and is not tampered, the new biometric certificate 4061 is registered. As a result, it is possible to safely reregister online the biometric certificate of the user.

Finally, in the authentication client 1000, the communication module 1010 receives the registration result from the authentication server 1100 (Step S4090), and the data display module 1014 displays the obtained registration result (Step S4100).

After the processing described above, the reregistration of the biometric certificate is completed.

In the same manner as in the processing of FIG. 3, also in the processing of FIG. 4A, the authentication client 1000 may not acquire the user ID 2021. In this case, all the biometric certificates 2041 registered with the biometric certificate storage module 1130 are acquired in Step S3120, and when the random-number biometric signature is successfully verified through use of any one of the acquired biometric certificates 2041 (Step S3160), the biometric certificate successfully verified is used to verify the biometric signature of the new biometric certificate with biometric signature 4071 (Step S4270). Then, when the new biometric certificate with biometric signature 4071 is successfully verified (Step S4280: success), a user ID corresponding to the biometric certificate successfully verified is associated with the new biometric certificate 4061 and registered with the biometric certificate storage module 1130. When the user ID 2021 is acquired, only the biometric certificate 2041 corresponding thereto is acquired, and hence a load on processing is alleviated. Meanwhile, when the user ID 2021 is not acquired, the user is not required to input the ID, and hence a load on the user is alleviated.

FIG. 7 is an explanatory diagram for illustrating an example of a user interface (UI) of the authentication client 1000 in the first embodiment of this invention.

The UI illustrated in FIG. 7 is used to perform the user authentication illustrated in FIG. 3 and the biometric certificate reregistration illustrated in FIG. 4A, for example. A textbox 7010 for inputting a user ID is referred to when the user ID is acquired in Step S2020. When an "authenticate" button 7020 is pressed, the user authentication processing procedure illustrated in FIG. 3 is started. When a "reregister biometric certificate" button 7030 is pressed, the reregistration of a biometric certificate illustrated in FIG. 4A, for example, is started. The UI illustrated in FIG. 7 is displayed on a screen when authentication is required, for example, at the time of login to the system or payment, and authentication that uses the biometric certificate is executed on this screen. The user can manually start the biometric certificate reregistration by pressing the "reregister biometric certificate" button 7030, but instead of displaying the "reregister biometric certificate" button 7030 on the screen, the system may also automatically execute the biometric certificate reregistration at any timing (e.g., false rejection occurs at a given frequency or more).

The textbox 7010 and the "reregister biometric certificate" button 7030 are examples of a message for receiving input of a user ID and a message for inquiring whether or not reregistration of a biometric certificate is required, respectively, and the authentication client 1000 may also output those messages in another form (e.g., as voice messages).

According to the first embodiment of this invention described above, when the biometric certificate is updated in the system configured to perform authentication through use of the biometric signature via the network, the new biometric certificate is generated based on the biometric information acquired from the user, the biometric signature is generated based on the obtained biometric certificate, and the new biometric certificate and the biometric signature are transmitted to the server. Then, the server verifies the biometric signature, and registers the new biometric certificate when the biometric signature is successfully verified. In this manner, it is guaranteed that the biometric certificate is not tampered, to thereby allow the biometric certificate to be safely updated via the network. With this, the user is allowed to reregister the biometric information via the authentication client, which is easy for the user to access. This eliminates the need to go to the location of the authentication server for reregistration, and hence a load on the user and a person in charge of managing biometric information is alleviated.

Second Embodiment

Next, a second embodiment of this invention is described below. Except for differences described below, the components of a system according to the second embodiment have the same functions as those of the components of the first embodiment that are illustrated in FIG. 1 to FIG. 4B and denoted by the same reference symbols. Descriptions thereof are therefore omitted here.

In the first embodiment, one type of biometric information is acquired in Step S3040 of FIG. 4A of acquiring biometric information. In contrast, in the second embodiment, two types of biometric information, namely, first biometric information and second biometric information, are acquired.

The biometric certificate reregistration of FIG. 4A and FIG. 4B has an object to replace the biometric certificate with which the normal user authentication illustrated in FIG. 3 can be performed with the biometric certificate with which the user can be authenticated more easily, and allows only completely the same modality (e.g., a fingerprint acquired from the same finger) to be reregistered. Accordingly, for example, change from a modality with which it is difficult to authenticate the user (e.g., a fingerprint acquired from a rough finger) to a modality with which the user can be authenticated easily (e.g., a fingerprint acquired from a smooth finger) cannot be performed in the processing procedure illustrated in FIG. 4A and FIG. 4B.

Further, when the biometric information changes over time, a case is conceivable in which a rate at which a genuine user cannot be authenticated increases and the user is not successfully authenticated unless the biometric information is acquired a number of times. In this case, a user can reregister the biometric certificate when the user is successfully authenticated, but a biometric certificate to be replaced is limited to the one generated from the biometric information registered when the user is successfully authenticated. Thus, a biometric certificate that is reregistered is generated from biometric information similar to that used to generate an existing biometric certificate, and hence a great increase in accuracy cannot be expected when a change over time of biometric information is taken into consideration.

In such cases, it is required to register a biometric certificate that allows a current user to be authenticated with high accuracy, even when the authentication results in failure with this new biometric certificate when the biometric certificate currently registered with the authentication server is used.

In view of the above, in the second embodiment, the authentication client 1000 acquires two types of biometric information, namely, first biometric information and second biometric information. The first biometric information is biometric information on the same modality as that used to generate the biometric certificate stored in the biometric certificate storage module 1130 (e.g., the same type of biometric information acquired from the same body part). The second biometric information is biometric information on a different modality (e.g., biometric information acquired from a different body part, or a different type of biometric information). The authentication client 1000 uses the first biometric information for user authentication and a biometric signature, and uses the second biometric information to generate a new biometric certificate. With this, when the first biometric information allows success of the user authentication that uses an existing biometric certificate, the biometric certificate can be registered irrespective of the type of the second biometric information.

In the following, referring to FIG. 5A and FIG. 5B, a description is given of processing procedures in the second embodiment of this invention.

Figure 5A:
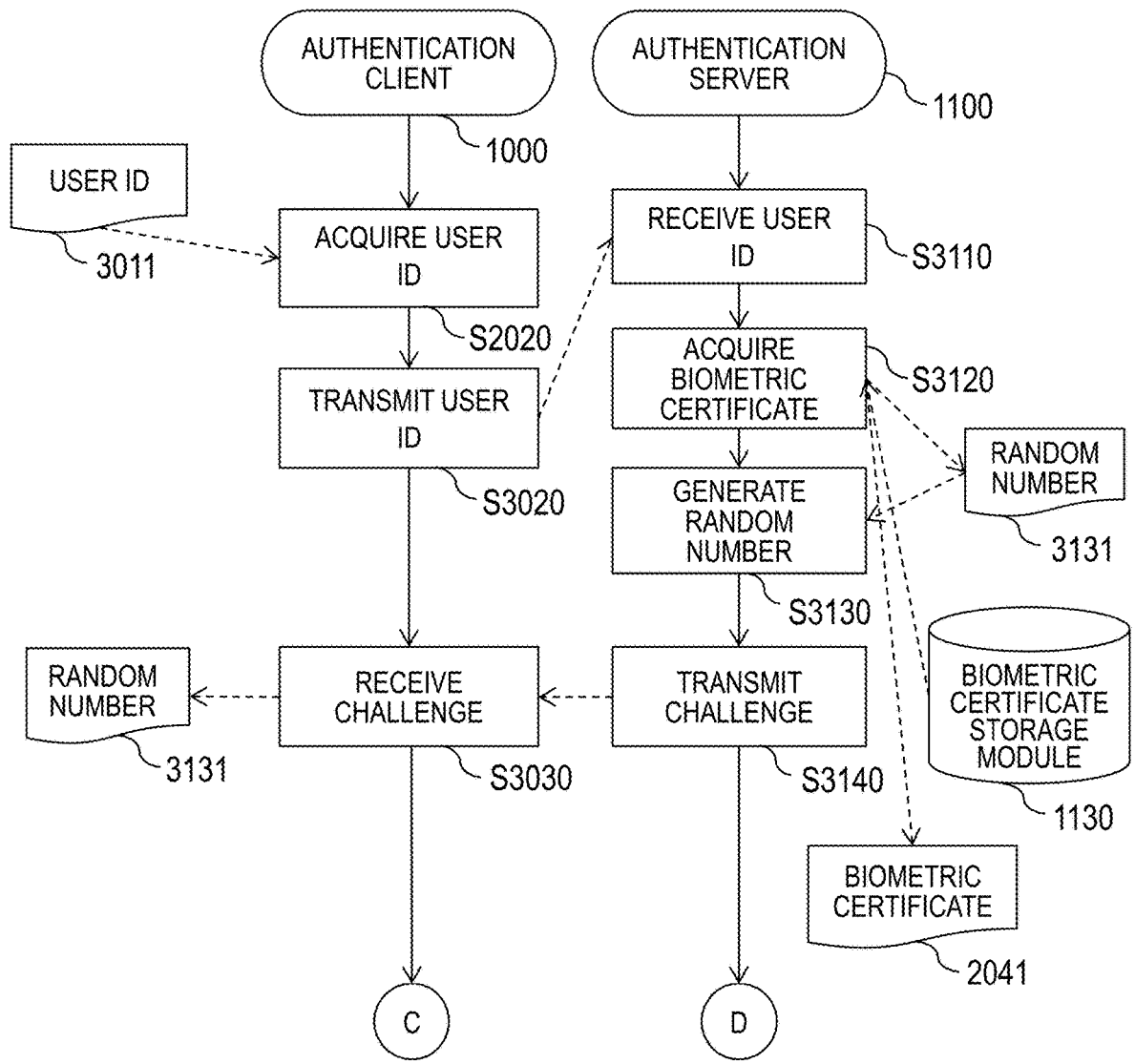
FIG. 5A and FIG. 5B are flowcharts for illustrating a processing procedure of additionally registering a biometric certificate in a second embodiment of this invention.
Figure 5B:
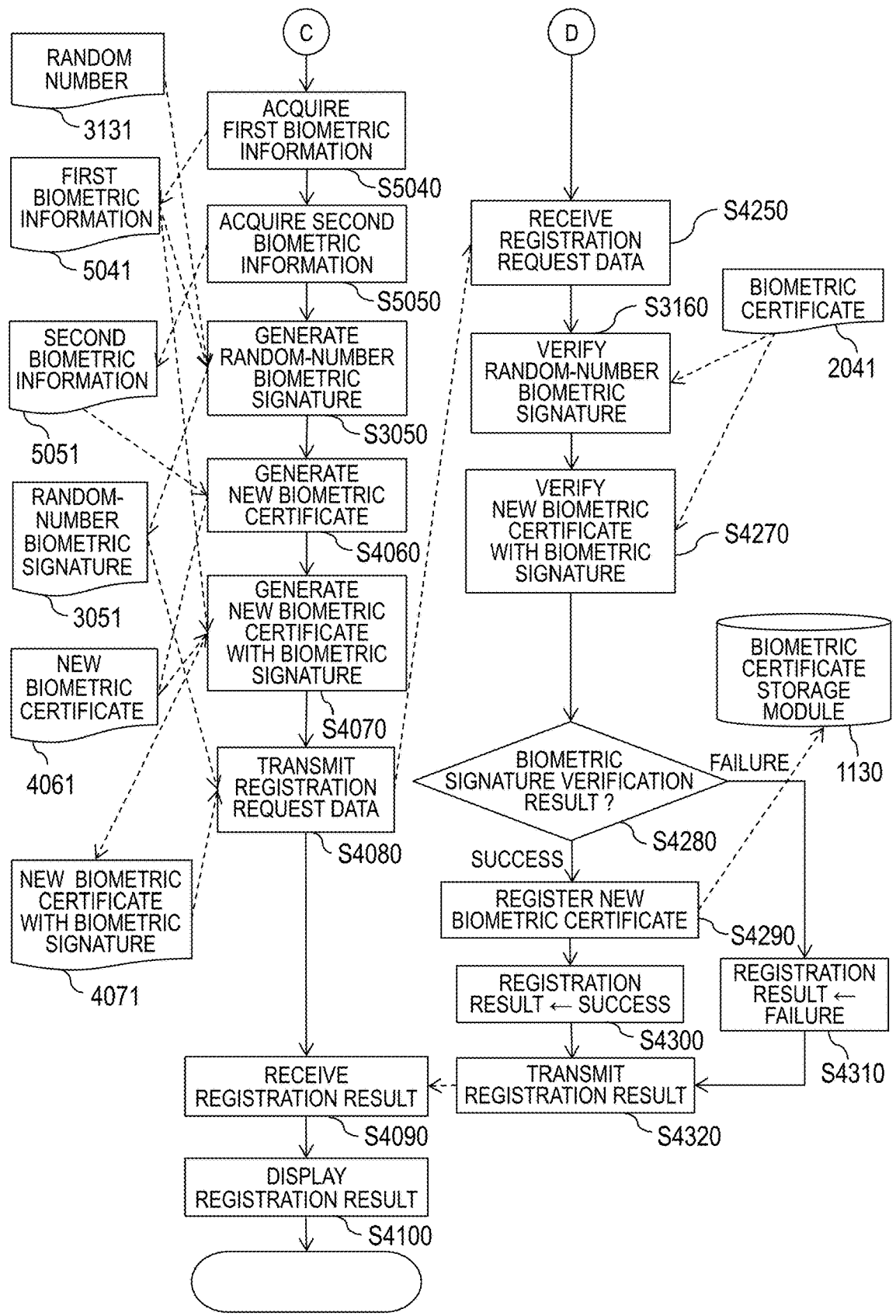

FIG. 5A and FIG. 5B are flowcharts for illustrating a processing procedure of additionally registering a biometric certificate in the second embodiment of this invention.

An overall processing procedure illustrated in FIG. 5A and FIG. 5B is the same as the processing procedure for biometric information reregistration illustrated in FIG. 4A and FIG. 4B except for the following differences. Specifically, Step S3040 of acquiring biometric information is replaced with Step S5040 and Step S5050 in which different processing is performed. Further, Step S3050 of generating a random-number biometric signature, Step S4060 of generating a new biometric certificate, and Step S4070 of generating a new biometric certificate with biometric signature differs from those of FIG. 4A and FIG. 4B only in data to be input for processing. In the following, only the differences from FIG. 4A and FIG. 4B are described.

Step S3040 of FIG. 4A of acquiring biometric information is divided into two steps, namely, Step S5040 of acquiring first biometric information and Step S5050 of acquiring second biometric information. First biometric information 5041 acquired in Step S5040 of acquiring first biometric information is used for the user authentication and the biometric signature, and hence biometric information acquired from a modality corresponding to an existing biometric certificate 2041 (e.g., a fingerprint acquired from a finger that has been used for authentication before) is used as the first biometric information 5041. Meanwhile, second biometric information 5051 acquired in Step S5050 of acquiring second biometric information is biometric information to be used for the authentication performed after a biometric certificate is additionally registered, and hence biometric information acquired from a modality desired to be used after the biometric certificate is additionally registered (e.g., a fingerprint acquired from a smooth finger) is used as the second biometric information 5051.

It should be noted that, when two types of biometric information are used to register the biometric certificate, it is required to ensure that an unauthorized biometric certificate is prevented from being registered. For example, when the biometric information on a genuine user is input as the first biometric information 5041, and then biometric information on a user different from the genuine user is input as the second biometric information 5051, a biometric certificate that allows authentication and signature verification with respect to the biometric information on the different user is issued as a result. In order to prevent such a situation, for example, it is required in some cases to provide an apparatus configured to acquire the biometric information with a system for guaranteeing that the first biometric information 5041 and the second biometric information 5051 are acquired from the same person (e.g., by simultaneously acquiring fingerprints from a plurality of fingers).

FIG. 8 is an explanatory diagram for illustrating an example of a UI for guaranteeing that the first biometric information 5041 and the second biometric information 5051 are acquired from the same person in the second embodiment of this invention.

An image 8010, which is acquired by photographing a user's hand with a camera, contains fingerprints of a plurality of fingers. When both of the first biometric information 5041 (in this case, a fingerprint acquired from a given finger) and the second biometric information 5051 (a fingerprint acquired from a finger different from that used to generate the first biometric information 5041) can be acquired in this manner by single acquisition of the biometric information, it can be guaranteed the first biometric information 5041 and the second biometric information 5051 are acquired from the same person. In the example of FIG. 8, as indicated by markers 8020 and 8030 indicating reading positions of two pieces of biometric information, pieces of information on fingerprints of index and middle fingers of the same person are acquired as the first biometric information 5041 and the second biometric information 5051.

In the above-mentioned example, pieces of the same type of biometric information on different body parts of the same person, such as pieces of information on fingerprints of index and middle fingers, are acquired. However, pieces of different types of biometric information on the same body part of the same person may be acquired. In this case, for example, the first biometric information 5041 is information on a fingerprint of an index finger, and the second biometric information 5051 is information on a vein of the same index finger. As another example, pieces of different types of biometric information on different body parts of the same person may be acquired.

The screen of FIG. 8 is an example of a message for receiving input of two pieces of biometric information, and the authentication client 1000 may output this message in another form (e.g., as a voice message).

Next, in Step S3050 of generating a random-number biometric signature and Step S4070 of generating a new biometric certificate with biometric signature, the first biometric information 5041 is used in place of the biometric information 2031 used in the processing of FIG. 4A, for example.

Meanwhile, in Step S4060 of generating a new biometric certificate, the second biometric information 5051 is used in place of the biometric information 2031 used in the processing of FIG. 4A, for example.

When the processing is changed in this manner, it is possible to additionally register the new biometric certificate 4061 generated from the second biometric information 5051, which is not successfully authenticated when an existing biometric certificate is used, with the authentication server 1100.

Figure 6:
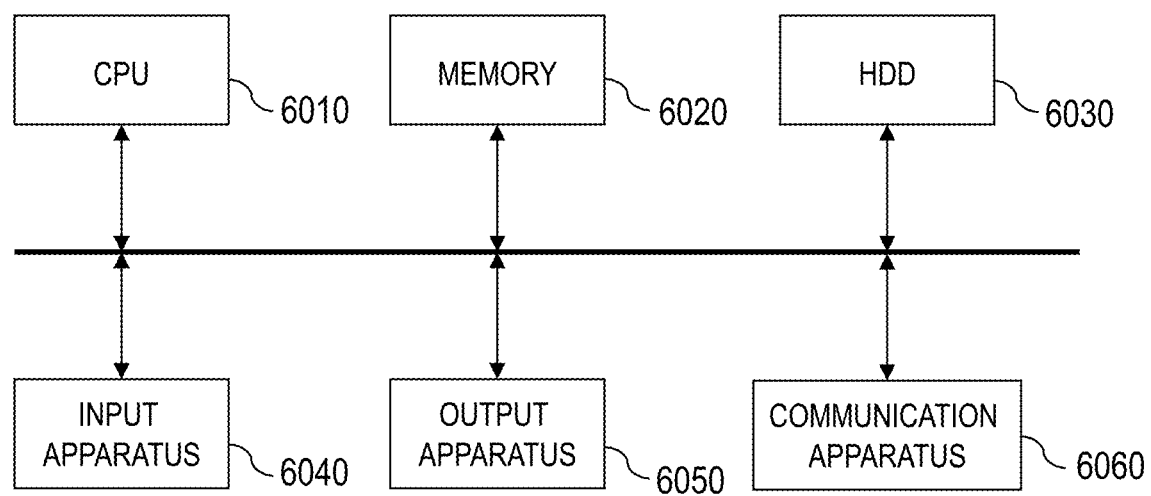
FIG. 6 is a block diagram for illustrating a hardware configuration of each of the authentication client and the authentication server in the system according to the first and second embodiments of this invention.

FIG. 6 is a block diagram for illustrating a hardware configuration of each of the authentication client 1000 and the authentication server 1100 in the system according to the first and second embodiments of this invention.

The hardware configuration of FIG. 6 includes a central processing unit (CPU) 6010, a memory 6020, a hard disk drive (HDD) 6030, an input apparatus 6040, an output apparatus 6050, and a communication apparatus 6060.

For example, each of the authentication client 1000 and the authentication server 1100 may be a computer having the hardware configuration illustrated in FIG. 6, and the communication apparatus 6060 of each of the computers may be coupled to the network 1200.

In this case, the CPU 6010 of the computer corresponding to the authentication client 1000 executes programs corresponding to the user ID reading module 1012, the biometric information reading module 1013, the data display module 1014, the biometric signature generation module 1020, the biometric signature verification module 1021, and the biometric certificate generation module 1022.

The memory 6020 of the computer corresponding to the authentication client 1000 stores the programs corresponding to the user ID reading module 1012, the biometric information reading module 1013, the data display module 1014, the biometric signature generation module 1020, the biometric signature verification module 1021, and the biometric certificate generation module 1022. The CPU 6010 executes those programs, to thereby implement the corresponding processing procedures.

Meanwhile, the CPU 6010 of the computer corresponding to the authentication server 1100 executes programs corresponding to the biometric signature verification module 1121, the biometric certificate generation module 1122, the biometric certificate registration module 1112, the biometric certificate acquisition module 1113, and the random number generation module 1123.

The memory 6020 of the computer corresponding to the authentication server 1100 stores the programs corresponding to the biometric signature verification module 1121, the biometric certificate generation module 1122, the biometric certificate registration module 1112, the biometric certificate acquisition module 1113, and the random number generation module 1123. The CPU 6010 executes those programs, to thereby implement the corresponding processing procedures.

The programs corresponding to the biometric signature verification module 1121 and the biometric certificate generation module 1122 may be the same as the programs corresponding to the biometric signature verification module 1021 and the biometric certificate generation module 1022, respectively.

In other words, the processing procedures executed by the respective modules in the first and second embodiments are actually executed by the CPU 6010 of each computer in accordance with the programs stored in the memory 6020.

The HDD 6030 corresponds to the biometric certificate storage module 1130. The data stored in each module is accumulated as data on the HDD 6030.

The input apparatus 6040 is used by the user ID reading module 1012 and the biometric information reading module 1013 to read information. For example, the input apparatus 6040 may include at least one of a keyboard, a fingerprint sensor, a vein sensor, or a camera.

The output apparatus 6050 is used by the data display module 1014 and the biometric certificate registration module 1112 to write out information. For example, the output apparatus 6050 may include a display apparatus for displaying the UIs illustrated in FIG. 7 and FIG. 8. The output apparatus 6050 may also include, for example, a speaker for outputting a voice message.

The communication apparatus 6060 is used when the authentication client 1000 and the authentication server 1100 communicate to/from each another via the communication modules 1010 and 1110.

In FIG. 1, the example is illustrated in which each of the authentication client 1000 and the authentication server 1100 is implemented by one computer and those two computers are coupled to each other via the network 1200, but the system according to the first and second embodiments may be implemented by one computer having the functions of the authentication client 1000 and the authentication server 1100. As another example, each of the authentication client 1000 and the authentication server 1100 may be implemented by a plurality of computers.

This invention is not limited to the embodiments described above, and encompasses various modification examples. For example, the embodiments have been described in detail for easier understanding of this invention, and this invention is not necessarily limited to a mode that includes all of the configurations described above. A part of the configuration of one embodiment may be replaced with the configuration of another embodiment, and the configuration of one embodiment may be used in combination with the configuration of another embodiment. In each embodiment, another configuration may be added to, deleted from, or replace a part of the configuration of the embodiment.

The components, functions, processing modules, processing measures, and the like described above may be implemented partially or entirely by hardware by, for example, designing the components and the like as an integrated circuit. The components, functions, and the like described above may also be implemented by software by interpreting and executing, with a processor, programs that implement the respective functions. The programs, tables, files, and other types of information for implementing the functions can be stored in a computer-readable non-transitory data storage medium such as a non-volatile semiconductor memory, or a hard disk drive, a solid state drive (SSD), or other storage device, or an IC card, an SD card, a DVD, or the like.

Further, the control lines and information lines considered to be required for the description are illustrated. It is not necessarily the case that all the control lines and information lines required for a product are illustrated. In actual practice, almost all the configurations may be considered as being connected to each other.

What is claimed is:

1. A biometric signature system, comprising:
    an authentication server including a storage device which stores a registered biometric certificate generated based on biometric information on a user;
    an authentication client including a processor programmed to:
    acquire new biometric information on the user;
    generate a new biometric signature based on the new biometric information;
    generate a new biometric certificate based on the new biometric information; and
    assign the new biometric signature to the new biometric certificate based on the new biometric information; and
    transmit the new biometric certificate to the authentication server as registration request data;
    wherein the authentication server including a processor programmed to:
    receive the registration request data;
    verify the new biometric signature included in the received registration request data using the biometric certificate stored in the storage device;
    verify the new biometric certificate based on the new biometric signature included in the received registration request data using the biometric certificate stored in the storage device; and
    store the new biometric certificate in the storage device as a reregistered biometric certificate of the user when the new biometric signature and the new biometric certificate are successfully verified,
    wherein the processor of the authentication client is further programmed to:
    acquire the new biometric information on the user which includes:
        first new biometric information, which is biometric information of a same body part and a same type as a body part and a type of biometric information used to generate the biometric certificate stored in the storage device, and
        second new biometric information, which is biometric information of one of a different body part and a different type from one of the body part and the type of the biometric information used to generate the biometric certificate stored in the storage device;
    generate the new biometric signature based on the first new biometric information; and
    generate the new biometric certificate based on the second new biometric information.

2. The biometric signature system according to claim 1, wherein the processor of the authentication client is further programmed to:
    output a message inquiring whether reregistration of the biometric certificate stored in the storage device is required; and
    when a request to reregister the biometric certificate stored in the storage device is input, acquire the new biometric information on the user.

3. The biometric signature system according to claim 1, wherein the processor of the authentication client is further programmed to:
when a frequency of occurrence of false rejection satisfies a predetermined condition, acquire the new biometric information on the user.

4. The biometric signature system according to claim 1, wherein the processor of the authentication client is further programmed to:
output a message for receiving input of the first new biometric information and the second new biometric information,
wherein the first new biometric information and the second new biometric information on the user are simultaneously acquired.

5. The biometric signature system according to claim 1, wherein the storage device stores a plurality of biometric certificates generated based on pieces of biometric information on a plurality of users,
wherein each of the plurality of biometric certificates comprises identification information on a corresponding one of the plurality of users,
wherein the processor of the authentication client is further programmed:
output a message for receiving input of identification information on the user; and
wherein the processor of the authentication server is further programmed to:
use the biometric certificate corresponding to the input identification information on the user to verify the new biometric signature.

6. The biometric signature system according to claim 1, wherein the storage device stores a plurality of biometric certificates generated based on pieces of biometric information on a plurality of users,
wherein each of the plurality of biometric certificates comprises identification information on a corresponding one of the plurality of users, and
wherein the processor of the authentication server is further programmed to:
when verification of the new biometric signature using any one of the plurality of biometric certificates has succeeded, the new biometric certificate is stored in the storage device with the identification information on the one of the plurality of users included in the one of the plurality of biometric certificates used in the verification of the new biometric signature that has succeeded.

7. The biometric signature system according to claim 1, wherein the authentication client and the authentication server are coupled to each other via a network,
wherein the processor of the authentication client is programmed to transmit the registration request data via the network, and
wherein the processor of the authentication server is programmed to receive the registration request data via the network.

8. The biometric signature system according to claim 1,
wherein the biometric certificate stored in the storage device is generated by subjecting the biometric information on the user to one-way conversion,
wherein the processor of the authentication client is programmed to generate the new biometric certificate by subjecting the new biometric information to one-way conversion, and
wherein the processor of the authentication server is programmed to determine that the new biometric signature is successfully verified when it is determined that an error between the new biometric information used to assign the new biometric signature to the new biometric certificate and the biometric information used to generate the biometric certificate stored in the storage device satisfies a predetermined condition.

9. A biometric certificate registration method, which is executed by a biometric signature system,
the biometric signature system including an authentication client and an authentication server storing a biometric certificate which is generated based on biometric information on a user,
the biometric certificate registration method comprising:
acquiring, by the authentication client, new biometric information on the user via an input apparatus;
generating, by the authentication client, a new biometric signature based on the new biometric information;
generating, by the authentication client, a new biometric certificate based on the new biometric information;
assigning, by the authentication client, the new biometric signature to the new biometric certificate based on the new biometric information;
verifying, by the authentication server, the new biometric signature using the biometric certificate stored in the authentication server;
verifying, by the authentication server, the new biometric certificate based on the new biometric signature using the biometric certificate stored in the authentication server;
registering, by the authentication server, the new biometric certificate when the biometric signature is successfully verified; and
acquiring the new biometric information on the user which includes:
first new biometric information, which is biometric information of a same body part and a same type as a body part and a type of biometric information used to generate the biometric certificate stored in the storage device, and
second new biometric information, which is biometric information of one of a different body part and a different type from one of the body part and the type of the biometric information used to generate the biometric certificate stored in the storage device;
generate the new biometric signature based on the first new biometric information; and
generate the new biometric certificate based on the second new biometric information.

\* \* \* \* \*